Feb. 5, 1963 R. HUSTED ET AL 3,076,557
PORTABLE, FOLDABLE SUPPORT
Filed Dec. 13, 1960 2 Sheets-Sheet 2
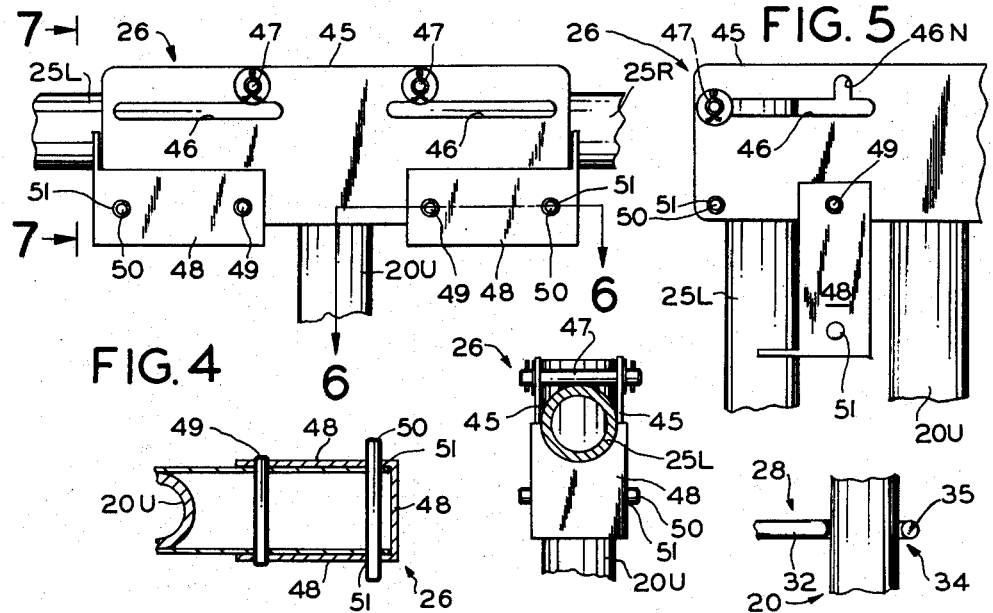
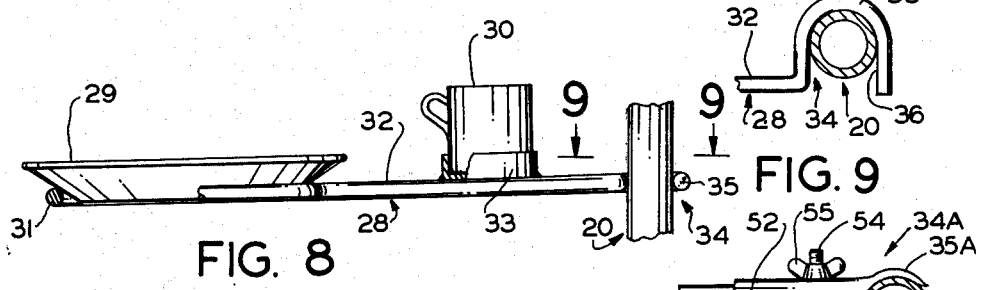
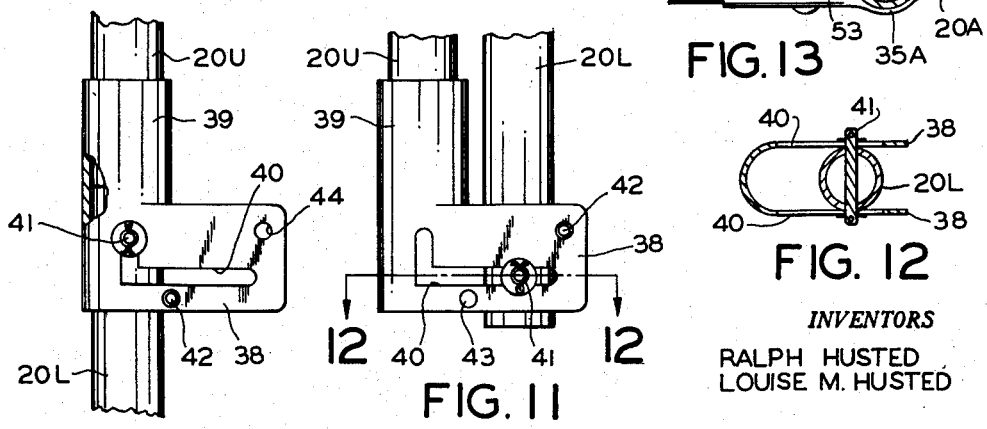
INVENTORS
RALPH HUSTED
LOUISE M. HUSTED

United States Patent Office 3,076,557
Patented Feb. 5, 1963

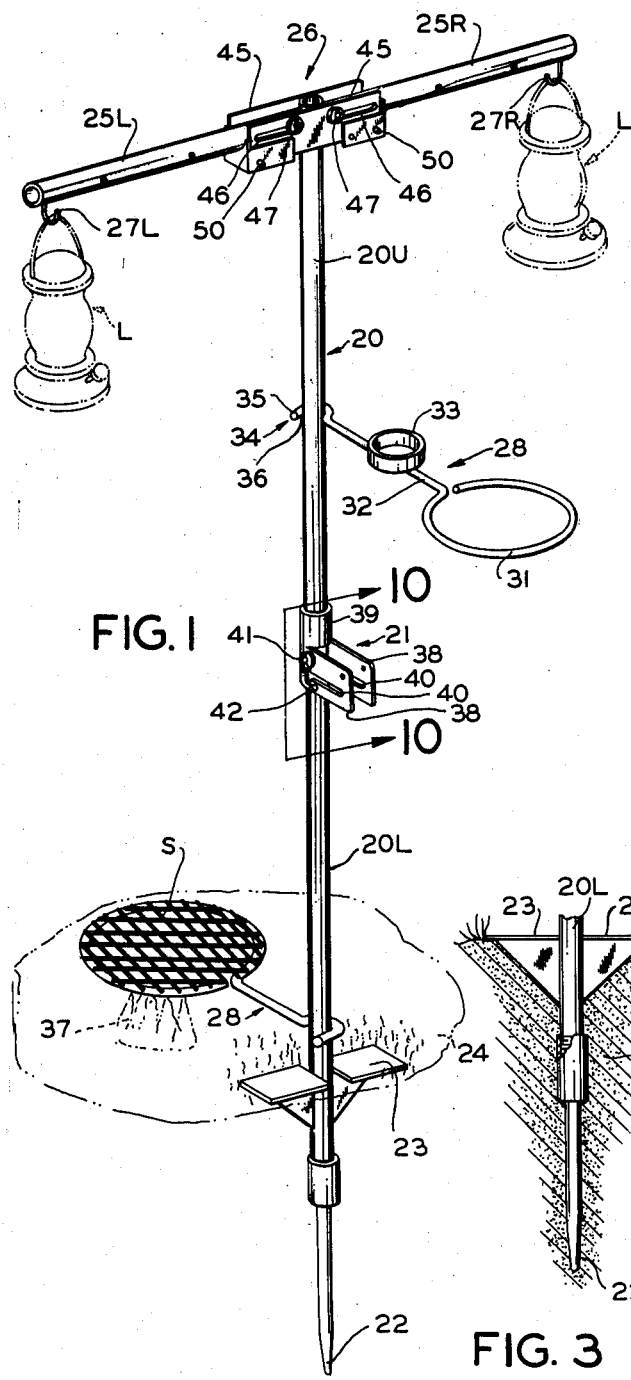
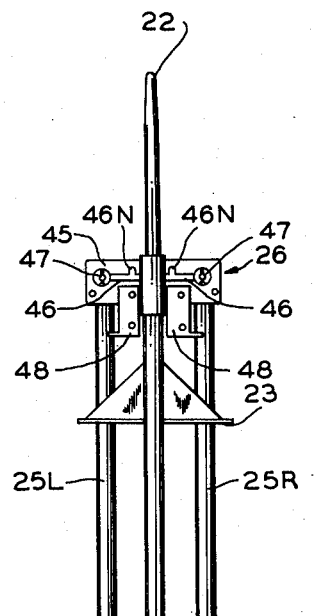

3,076,557
PORTABLE, FOLDABLE SUPPORT
Ralph Husted and Louise M. Husted, Huntington Park, Calif., assignors of one-tenth to Gadget-Of-The-Month Club, Inc., North Hollywood, Calif., a corporation of California
Filed Dec. 13, 1960, Ser. No. 75,591
5 Claims. (Cl. 211—178)

The present invention consists of a portable, foldable support which, in one preferred form, is adapted to removably support lamp means, and food container means, or the like, and which, therefore, in said preferred form may be said to comprise a portable, foldable combination lamp support and food container support. The invention will be described in connection with this particular embodiment through this application. However, it should be clearly understood that the invention is not specifically limited to support these particular items but may be employed for supporting a variety of different items. It may even be employed for stringing one or more lines between two such support members for the purpose of providing one or more transverse supporting lines adapted to carry auxiliary objects thereover or depending therefrom in a clothesline-like manner.

Furthermore, it should be noted that, in the preferred form referred to above, one or more of the food containers adapted to be supported may comprise a cooking vessel so positioned as to be effectively heated by underlying heating means such as a fire, or the like, for the purpose of cooking food contained in the vessel. Others of the food containers adapted to be supported by the preferred embodiment of the present invention may comprise dishes, cups, or the like, suitable for use in eating and drinking a quantity of foods and/or beverages.

It should be noted that the preferred form of the invention referred to hereinabove and described hereinafter may be provided with a ground-penetrating point at the bottom thereof and shoe-engageable transverse means positioned at a predetermined distance above said ground-penetrating point and adapted for use in driving or forcing the point into an underlying ground surface whereby to support the entire device in an upright position and yet in an easily removable manner.

It should also be noted that the preferred form of the invention referred to above and described in detail hereinafter includes pivotally interconnected or foldable means so arranged as to make it possible to fold the entire device into a form wherein it consists of a plurality of longitudinal members in substantially side-by-side parallel relationship for ready portability and storage.

It is an object of the present invention to provide a portable, foldable support of the character referred to above, which is of extremely simple, cheap, foolproof construction such as to be conductive to widespread use thereof.

Further objects are implicit in the detailed description which follows hereinafter and will be apparent to persons skilled in the art after a careful study thereof.

For the purpose of clarifying the nature of the present invention, two exemplary embodiments are illustrated in the hereinbelow-described figures of the accompanying two sheets of drawings and are described in detail hereinafter.

FIG. 1 is an oblique view of one illustrative embodiment of the invention in mounted operative position. It is shown supporting two lamps at the top and is also shown with a lowermost one of the bottom transverse carrying means provided with multi-apertured screen means adapted to amount directly thereon food which is to be cooked by the underlying fire or to carry an additional container such as a frying pan or other cooking pan having such food therein. Only one upper transverse food container carrying means is shown in this view, although a number of such carrying means may be carried by the vertical shaft when in use. Also, the upper carrying means is shown without a food container in supported relationship with respect thereto. This is done for reasons of drawing simplification and clarity since such supported relationship is shown in FIG. 8. The vertical longitudinal member is shown substantially shorter than its real length in this view with respect to the other proportions of the apparatus. This is done for space conservation reasons to enable the figure to be placed on the sheet.

FIG. 2 is an elevational view of the apparatus in folded form for convenient portability and/or storage.

FIG. 3 is a fragmentary elevational view of the bottom portion of the longitudinal member shown in FIG. 1 illustrating the ground-penetrating point at the bottom thereof and the shoe-engageable transverse means for use in forcing the point into the underlying ground and also for use in facilitating removal therefrom.

FIG. 4 is an enlarged elevational view of the pivotally connected portion of the two fold-down transverse arm members shown at the top of FIG. 1 which are adapted to support lamp means, or the like, at their outer ends.

FIG. 5 is an elevational view of the left portion of FIG. 4 after the left transverse arm member has been folded downwardly into the completely folded position for portability and storage such as is shown in full in FIG. 2. It should be understood that the right transverse arm member folds down in a similar manner.

FIG. 6 is a fragmentary sectional view taken in the direction of the arrows 6—6 of FIG. 4.

FIG. 7 is a fragmentary view, partly in section and partly in end elevation, taken in the direction of the arrows 7—7 of FIG. 4.

FIG. 8 is a fragmentary, partly broken away view showing one of the transverse food container carrying means in locked engagement with the vertical longitudinal member and carrying a dish and a cup.

FIG. 9 is a fragmentary view taken in the direction of the arrows 9—9 of FIG. 8.

FIG. 9a is a view similar to FIG. 9 but shows the inner engaging means before it is locked on the longitudinal member in the manner shown in FIGS. 8 and 9.

FIG. 10 is a fragmentary elevational view of the intermediate foldable junction means in the middle of the longitudinal vertical member taken in the direction of the arrows 10—10 of FIG. 1.

FIG. 11 is a fragmentary elevational view similar to FIG. 10 but shows the intermediate foldable junction means after it has been completely folded as seen in the direction of the arrows 11—11 of FIG. 2.

FIG. 12 is a sectional view taken in the direction of the arrows 12—12 of FIG. 11.

FIG. 13 is a fragmentary view generally similar in aspect and orientation to FIG. 9 but illustrates a slight modification of the inner engaging means wherein it comprises controllably closable and openable spring biased clamp means and threaded adjusting and constricting means.

Referring to FIGS. 1–12 for examplary purposes, one illustrative embodiment of the invention takes a typical exemplary form wherein its comprises a longitudinal member 20 having an upper section 20U and a lower section 20L interconnected by intermediate foldable junction means, indicated generally at 21, which will be described in detail hereinafter. The longitudinal member 20 is provided with a ground-penetrating point 22 at the bottom thereof and shoe-engageable transverse means 23 positioned a predetermined distance above the ground-penetrating point 22 and adapted for use in driving the point 22 into an underlying ground surface 24 for supporting the entire longitudinal member 20 in an upright position as shown in FIGS. 1 and 3.

The longitudinal member 20 is provided at the top thereof with twin fold-down tranverse arm members 25L and 25R which are effectively pivotally attached with respect to the upper end of the top portion 20U of the longitudinal member 20 by pivotal attachment means, indicated generally at 26, which will be described in greater detail hereinafter. Each of the arm members 25L and 25R is provided with engaging means, such as the hooks 27L and 27R, for engaging and supporting lantern means, such as indicated generally at L, or other desired objects.

The longitudinal member is provided with one or more transverse carrying means such as indicated generally at 28. The upper one of the carrying members 28 shown in FIG. 1 and also in FIGS. 8, 9, and 9a is adapted to carry food containers such as the plate or dish 29 shown in FIG. 8 and also a beverage container or cup such as that shown at 30 in FIG. 8; the dish supporting portion of the transverse carrying portion 28 comprising a circular loop 31 connected to the transverse arm 32; and the cup-supporting portion comprising a circular receptacle 33 carried by the transverse arm 32.

The inner end of the transverse arm 32 is provided with an inner engaging end or means, indicated generally at 34, which takes the form of a substantially U-shaped element 35 integral with the transverse arm 32 and defining a receiving opening 36 of substantially the same (or very slightly greater) transverse diameter as the exterior diameter of the longitudinal shaft member 20 whereby the U-shaped member 35 may be slipped onto exterior engagement with the shaft member 20 when the transverse arm 32 is perpendicular with respect to the shaft member 20 as shown in FIG. 9a, after which the weight of the carrying means 28, the dish 29, and the cup 30 causes the outer end of the carrying means 28 to move downwardly very slightly so as to apply a twisting torque in a vertical plane to the U-shaped engaging member 35 in a manner whereby to frictionally bind it on the longitudinal shaft member 20 in an immobile manner as shown in FIGS. 8 and 9 until upward lifting movement is applied to the remote end of the carrying means 28 for releasing the inner engaging means 34 from the longitudinal shaft member 20 to allow removal therefrom, when desired.

The lower carrying means 28 shown in FIG. 1 may be somewhat larger than the upper one shown in FIG. 1 and is provided with multi-apertured screen means S whereby to effectively provide a cooking burner adapted to be positioned over a source of heat of any suitable type, such as the fire indicated at 37 in FIG. 1, or the like, for heating food carried directly on the screen S or food carried in an auxiliary container (not shown) adapted to be positioned thereon. It should be noted that when the food is placed directly on the multi-apertured screen S, it may be considered to be a food container.

It should be noted that any desired number of the food carrying means 28 may be positioned along the shaft member 20 at various longitudinal locations and at various angular relationships with respect to the longitudinal shaft member 20.

The intermediate foldable junction means indicated generally at 21 comprises two transversely spaced plates 38 fastened by a member 39 to the lower end of the upper shaft portion 20U, with each of said plates 38 being provided with a substantially L-shaped slot 40 which cooperates with a transverse pin 41 carried by the upper end of the lower shaft portion 20L so as to allow the device to be positioned in the extended orientation shown in FIGS. 1 and 10 or in the folded orientation shown in FIGS. 2, 11, and 12, in either of which positions the intermediate foldable junction means 21 is adapted to be maintained by locking pin means 42 which can be positioned in lower aligned apertures 43 or upper aligned apertures 44 in the transverse plates 38 for locking the device in either the extended position or folded position. This is clearly shown in FIGS. 10, 11, and 12.

The pivotal attachment means indicated generally at 26 comprises a pair of parallel plates 45 rigidly attached with respect to the upper end of the upper shaft portion 20U and provided with aligned slot means 46 in each plate 45 and on each side of the upper end of the upper shaft portion 20U, with said slots 46 cooperating with twin atachment pins 47 firmly carried by inner ends of the transverse arms 25L and 25R for movement between the extended positions shown in FIGS. 1, 4, 6, and 7, and the retracted folded positions shown in FIGS. 2 and 5 by relative movement of said pins 47 with respect to the slots 46 and locking notch portions 46N.

It should further be noted that supporting members 48 are positioned on each side of the upper shaft portion 20U and pivotally connected by pivot pin means 49 to the opposed plates 45 for movement between supporting positions as shown in FIGS. 1, 4, 6, and 7 and folded positions as shown in FIGS. 2 and 5, which is allowed by means of removable locking pin means 50 carried in aligned apertures 51 in the supporting members 48 and the plates 45. This is clearly shown in FIGS. 4-7.

The arrangement is such that the intermediate junction means 21 can be moved into folded position and the pivotal attachment means 26 can be moved into folded position so that the entire device will be in the compact folded form shown in FIG. 2 for ready portability and/or storage.

FIG. 13 illustrates a slight modification of the inner engaging means, which is indicated generally by the reference numeral 34A. In this modification, said inner engaging means takes the form of a controllable closable and openable clamp means including opposed clamp elements 35A adapted to engage the shaft member 20A and having rear portions pivotally connected as indicated at 52, and including biasing spring means 53 biasing the opposed clamp member 35A apart and carried by the shaft of a threaded bolt 54 which is engaged by a threaded wing nut 55 adapted for use in controllably manually constricting the engaging means 34A against the action of the biasing spring 53 around the longitudinal shaft member 20A. Also various other inner engaging means may be employed within the basic spirit and scope of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

We claim:

1. A portable, foldable support comprising: a longitudinal member provided with a ground-penetrating point at the bottom thereof, foot-engageable transverse means positioned a predetermined distance from said ground-penetrating point and adapted for use in driving the point into an underlying ground surface for supporting the entire longitudinal member in upright position; a plurality of transverse object-carrying means each having an inner engaging means removably engaged with respect to the longitudinal member at a different one of a plurality of selected locations along and around said longitudinal member and extending outwardly transversely therefrom whereby to effectively comprise supporting means for multiple objects, a lowermost one of said carrying means having an engaging and carrying portion outwardly spaced from its inner engaging means and adapted to be positioned over a source of heat whereby to define a cooking burner for cooking purposes; said longitudinal member being provided adjacent the top thereof with twin-fold down transverse arm members having engaging means for engaging and supporting one or more desired objects; said longitudinal member being further provided with an intermediate foldable junction means including hinge means and locking means for locking upper and lower portions of the longitudinal member above and below said junction means in rigid aligned vertically directed relationship and for controllably unlocking same and folding said upper and lower portions into side-by-side substantially parallel relationship for ready portability and storage.

2. Apparatus of the character defined in claim 1, wherein said inner engaging means comprises a substantially U-shaped element carried at the inner end of each of the transverse carrying means and defining a receiving opening of slightly larger transverse diameter than the diameter of the longitudinal member.

3. Apparatus of the character defined in claim 1, wherein said inner engaging means comprises controllably closable and openable clamp means provided with biasing spring means biasing it into open position and provided with threaded means for controllably manually constricting it.

4. A portable, foldable support, comprising: a longitudinal member provided with a ground-penetrating point at the bottom thereof, shoe-engageable transverse means positioned a predetermined distance from said ground-penetrating point and adapted for use in driving the point into an underlying ground surface for supporting the entire longitudinal member in upright position; and transverse container carrying means having an inner engaging means removably engaged in partially encompassing relationship with respect to the longitudinal member at a desired location and extending outwardly transversely therefrom and being provided at an outer remote end with container-engaging means adapted to underlie a container, the weight of the remote container-engaging end and means being such as to apply a twisting torque in a vertical plane to the inner engaging means partially encompassing the longitudinal member whereby to frictionally bind it thereon in an immobile manner until upward lifting movement is applied to the remote end of the carrying means for releasing said inner engaging means from the longitudinal member to allow removal therefrom, when desired, said longitudinal member being provided with a plurality of said container carrying means at various selected locations along and around said longitudinal member whereby to effectively comprise supporting means for multiple containers, each of said carrying means comprising a transverse arm provided with a circular loop at the outer end of a size such as to supportingly engage and cooperate with the bottom of a desired type of container; each of said inner engaging means comprising a substantially U-shaped element carried at the inner end of the corresponding one of said transverse arms of said carrying means and defining a receiving opening of substantially the same but slightly larger transverse diameter than the diameter of the longitudinal member; said longitudinal member being provided at the top thereof with twin pivotally and slidably attached fold-down transverse arm members having engaging means for engaging and supporting lantern means; said longitudinal member being further provided with an intermediate foldable junction means including hinge means and locking pin means for locking upper and lower portions of the longitudinal member above and below said junction means in rigid aligned vertically directed relationship and for controllably unlocking same and folding said upper and lower portions into side-by-side substantially parallel relationship for ready portability and storage.

5. Apparatus of the character defined in claim 4, wherein a lowermost one of said container carrying means has a container-engaging portion substantially larger than the others and provided with multi-apertured screen means adapted to be positioned over a source of heat whereby to define a cooking burner for cooking purposes.

References Cited in the file of this patent

UNITED STATES PATENTS

| | | |
|---|---|---|
| 141,498 | Edmonston | Aug. 5, 1873 |
| 172,043 | Masters | Jan. 11, 1876 |
| 670,144 | Bond | Mar. 19, 1901 |
| 699,066 | Baskett | Apr. 29, 1902 |
| 1,175,278 | Livermore | Mar. 14, 1916 |
| 1,662,586 | Newman | Mar. 13, 1928 |
| 1,830,282 | Lorch | Nov. 3, 1931 |
| 2,269,790 | Sherrill | Jan. 13, 1942 |
| 2,748,955 | Anselmo | June 5, 1956 |
| 2,765,999 | Baker | Oct. 9, 1956 |
| 2,800,164 | Chambers | July 23, 1957 |